Figure 1:
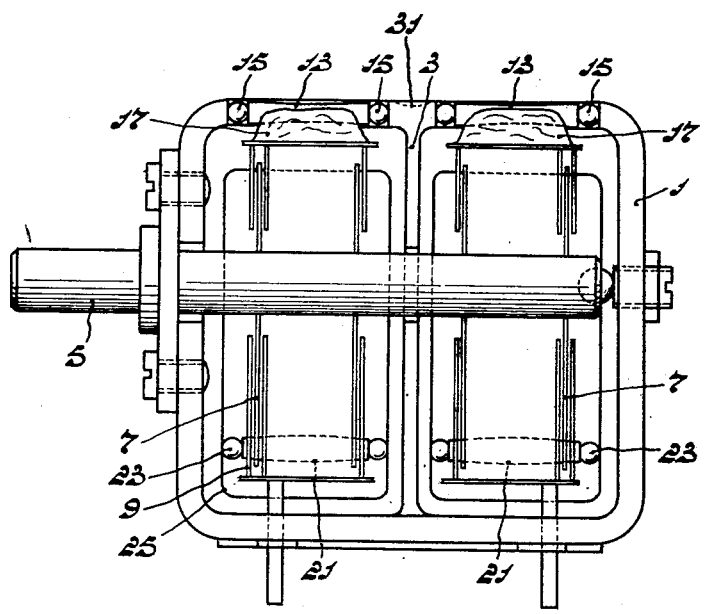

Jan. 1, 1952 — J. D. REPKO — 2,580,702

VARIABLE CAPACITOR

Filed Feb. 16, 1950

INVENTOR.
JAN DIRK REPKO
BY
AGENT

Patented Jan. 1, 1952

2,580,702

UNITED STATES PATENT OFFICE 2,580,702

VARIABLE CAPACITOR

Jan Dirk Repko, Eindhoven, Netherlands, assignor to Hartford National Bank and Trust Company, Hartford, Conn., as trustee Application February 16, 1950, Serial No. 144,472
In the Netherlands February 18, 1949

5 Claims. (Cl. 175—41.5)

The invention relates to variable capacitors of the type comprising a housing in which a number of supporting members for the stator are clamped between insulating balls.

In a prior construction of a variable capacitor of this kind, which has since been discontinued, each of the rod-shaped supporting members with an insulating ball at each end was clamped between the front and the rear frame plates of the capacitor. These plates, which comprised the two bearings for the capacitor shaft, were held by at least three transverse bolts having parallel axes. These transverse bolts, which are required for clamping the supports and balls, render the construction comparatively costly and not suited for mass production. Furthermore, such a housing can only be manufactured accurately with difficulty, since it is not very stable, so that the spacing between the plates must be large and the capacitor becomes comparatively bulky.

The invention has for its object to avoid these difficulties and to provide a construction which is particularly suited to mass production.

According to the invention, the supporting members are secured in the housing by plastic deformation of at least one of the parts between which the balls associated with the supporting member are gripped. The deformation is preferably attained by compressing a rod-shaped supporting member in a transverse direction, for example by flattening, so that the rod increases in length sufficiently for the assembly of a rod and two balls to be firmly clamped between the two transverse surfaces available in the housing (i. e. surfaces at right angles to the direction of clamping) between which the assembly is arranged. In this case, the housing of the condenser is previously manufactured and may thus be assembled from few components at very low cost by means of spot welding or may be made in one piece, for example, by diecasting. In either case the housing is very rigid and relatively non-deformable. The cost of securing the support members by flattening are very low.

The supporting member together with the balls is preferably housed in a recess in a wall of the housing. This provides great rigidity for the transverse surfaces, which is desirable, since the deformation of the supporting member involves comparatively great forces which may not result in the transverse surface being bent apart, and hence in deformation of the housing as a whole. A local deformation of the transverse surfaces for example because of slight penetration of the balls into these surfaces, is not harmful. This even assists in rigidly securing the rod-shaped member. As an alternative, the attachment itself may be obtained by local deformation of a wall rather than by deformation of the supporting member or if desired in conjunction therewith.

Figure 2:
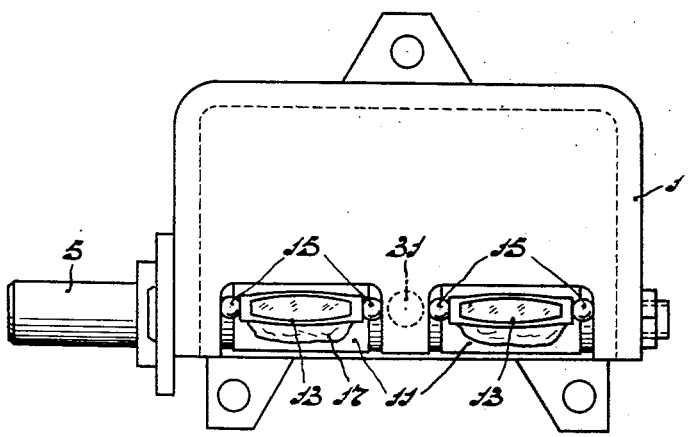

The invention will now be described with reference to the drawing in which:

Fig. 1 is a side elevational view of a capacitor according to the invention; and Fig. 2 is an elevational view showing the transverse support for the capacitor according to the invention.

The variable twin-capacitor shown comprises a trough-shaped case 1 of aluminium made preferably by die-casting and having two compartments separated by a partition 3. A shaft 5 is supported in the usual manner in two opposite lateral walls of the trough 1 and has rotor plates 7 secured to it, for example by soldering. A stator 9 is also of conventional construction and only part of the plates is shown.

One of the side walls of the case 1 is provided with two U-shaped recesses 11, adjacent the free edge of the wall (Fig. 2). Arranged in each of these recesses and constituted by a brass rod is a supporting member 13 for the stator. A ceramic ball 15 is provided at each of the ends of the rod and in line therewith.

According to the invention, the assembly of a support 13 and two balls 15 is clamped in one of the U-shaped recesses 11, the supporting member 13 being slightly pinched in a transverse direction. This is carried out prior to the fitting of the stator 9; with the use of a suitable tool the assembly 13, 15 is introduced into the recess 11 in which it fits with a certain amount of play after which the supporting member 13 is compressed for part of its length between two (or more) dies in a direction approximately at right angles to the plane of drawing of Fig. 2. The flattening of the originally circular rod which is thus produced is clearly shown in Fig. 2. As a result of the flattening operation the rod has lengthened, so that the assembly 13, 15 is firmly gripped between the transverse surfaces of the U-shaped recess facing each other.

With the use of solder or cement (17 in Fig. 1) the stator 9 is secured in the usual manner to the supporting member 13 and a second similar supporting rod 21. In the manner described above the supporting member 21 is clamped, together with two insulating balls 23, in a rectangular recess 25 in the bottom of the trough-shaped case 1.

These recesses (11 and 25) are at least largely surrounded by wall parts of comparatively large size in the direction of the clamping force, these parts being furthermore engaged by a transverse wall (in this case the lateral walls of the container 1 and the partition 3). The transverse surfaces between which the supports together with their balls are clamped (for example the limbs of the U formed by the recesses 11) thus exhibit a high resistance to bending out of shape of the assembly. Local deformations are produced, for example, since the balls 15 are slightly pressed into the comparatively soft aluminium of the case 1 when the rod 13 is being flattened. This assists in holding the assemblies 13, 15 after they have been secured in place by pinching. For the same purpose the ends of the rod 13 are provided, preferably previously with, for example, conical notches, in which the balls 15 may become seated.

However, in principle, instead of being clamped in recesses of one wall, the assemblies 13, 15 and 21, 23 may be clamped between two different walls of the case 1, for example a lateral wall and the partition 3.

A further possibility for clamping the support 13 and its balls 15 is local plastic deformation of the wall of the case 1, for example, by pressing a recess 31 into the lateral wall part comprised between the two recesses 11. The material available in the wall is thus urged, for example, towards the two supporting members 13, so that the latter are tightly secured. This measure may be taken, if desired, in conjunction with the plastic deformation of the support.

As shown in Fig. 1, the support 13 lies practically within the periphery of the lateral wall in which it is arranged. This results in an economy in space, whilst the probability of a short circuit being established through adjacent parts is slight.

It is obvious from the foregoing that the construction according to the invention ensures very cheap and efficient insulated fastening of the stator of a variable condenser, this fastening, owing to the small mass of the support, having in addition, but little effect on the zero capacitance of the capacitor.

While I have thus described the invention with a specific embodiment thereof, other embodiments will appear obvious to those skilled in the art without departing from the spirit and scope of the invention.

What I claim is:

1. A stator mounting for a variable capacitor comprising a housing, a transversely flattened rod-shaped member supporting a stator assembly, and a ball of insulating material interposed between one end of the rod-shaped member and the housing thereby clamping the same with the housing.

2. A stator mounting for a variable capacitor comprising a housing having a recess therein, a transversely flattened rod-shaped member supporting a stator assembly, one end of said member extending into said recess and a ball of insulating material in the said recess interposed between the end of the rod-shaped member and the housing thereby clamping the same with the housing.

3. A stator mounting for a variable capacitor comprising a housing having a recess therein with a given transverse surface, a transversely flattened rod-shaped member supporting a stator assembly, said member extending into the said recess, and a ball of insulating material in the said recess interposed between the end of the rod-shaped member and the said transverse surface thereby clamping the same to the housing.

4. A stator mounting for a variable capacitor comprising a housing having a recess therein, a transversely flattened rod-shaped member supporting a stator assembly, one end of said member extending into the said recess, the end of said rod-shaped member extending into said recess being flattened in a direction transverse to the length thereof, and a ball of insulating material interposed between the end of the rod-shaped member and the housing to clamp the same to the housing.

5. A stator mounting for a variable capacitor as claimed in claim 4 in which the supporting member is positioned primarily within the recess and clamped with a ball of insulating material at each end thereof.

JAN DIRK REPKO.

REFERENCES CITED

The following references are of record in the file of this patent:

UNITED STATES PATENTS

| Number | Name | Date |
|---|---|---|
| 1,620,244 | Swope | Mar. 8, 1927 |
| 2,039,623 | Bennett | May 5, 1936 |
| 2,235,180 | Teaf | Mar. 18, 1941 |
| 2,394,947 | Stephens | Feb. 12, 1946 |

FOREIGN PATENTS

| Number | Country | Date |
|---|---|---|
| 119,238 | Austria | Oct. 10, 1930 |